(12) United States Patent
Handa

(10) Patent No.: US 7,938,150 B2
(45) Date of Patent: May 10, 2011

(54) STATION SIDE COOLING FOR REFUELING VEHICLE STORAGE TANKS WITH HIGH PRESSURE FUEL

(75) Inventor: Kiyoshi Handa, Tochigi (JP)

(73) Assignee: Honda Motor Co, Ltd, Tokyo (JP)

( * ) Notice: Subject to any disclaimer, the term of this patent is extended or adjusted under 35 U.S.C. 154(b) by 1002 days.

(21) Appl. No.: 11/761,093

(22) Filed: Jun. 11, 2007

(65) Prior Publication Data

US 2008/0302504 A1 Dec. 11, 2008

(51) Int. Cl.
*B60K 15/03* (2006.01)
*F17C 5/06* (2006.01)

(52) U.S. Cl. ............... 141/82; 141/45; 141/95; 141/285; 165/41

(58) Field of Classification Search ..................... 141/44, 141/45, 82, 95, 285; 62/50.1–50.5; 165/41–42
See application file for complete search history.

(56) References Cited

U.S. PATENT DOCUMENTS

| | | | | |
|---|---|---|---|---|
| 6,899,146 B2 * | 5/2005 | Bingham et al. | ................ | 141/82 |
| 7,124,790 B2 * | 10/2006 | Bushko | ............................ | 141/82 |
| 7,377,294 B2 * | 5/2008 | Handa | .............................. | 141/82 |
| 7,559,689 B2 * | 7/2009 | Harty | ............................... | 141/82 |
| 7,637,292 B2 * | 12/2009 | Handa | .............................. | 141/82 |
| 7,681,604 B2 * | 3/2010 | Handa | .............................. | 141/82 |
| 7,735,528 B2 * | 6/2010 | Handa | .............................. | 141/82 |
| 7,743,797 B2 * | 6/2010 | Handa | .............................. | 141/82 |
| 7,757,726 B2 * | 7/2010 | Handa | .............................. | 141/82 |
| 7,757,727 B2 * | 7/2010 | Handa | .............................. | 141/82 |
| 7,866,354 B2 * | 1/2011 | Kanoya et al. | .................. | 141/95 |
| 2008/0250804 A1 * | 10/2008 | Kubo et al. | ..................... | 165/44 |
| 2008/0289591 A1 * | 11/2008 | Tessier et al. | ................... | 141/82 |

* cited by examiner

*Primary Examiner* — Gregory L Huson
*Assistant Examiner* — Nicolas A Arnett
(74) *Attorney, Agent, or Firm* — Mark E Duell; Porter Wright Morris & Arthur, LLP

(57) ABSTRACT

Reduction of fuel tank heating during the refueling process is effected by a coolant exchange between the station and the vehicle whereby an on board heat exchanger internal to the tank is interconnected through a heat exchanger external to the tank with a station side cooler that cools the refill gas to an ambient temperature. As a result of station provided ambient temperature cooling, the vehicle does not need to have particularly complicated on-board cooling devices, nor does the station need to be encumbered with complex and expensive pre cooling devices.

23 Claims, 6 Drawing Sheets

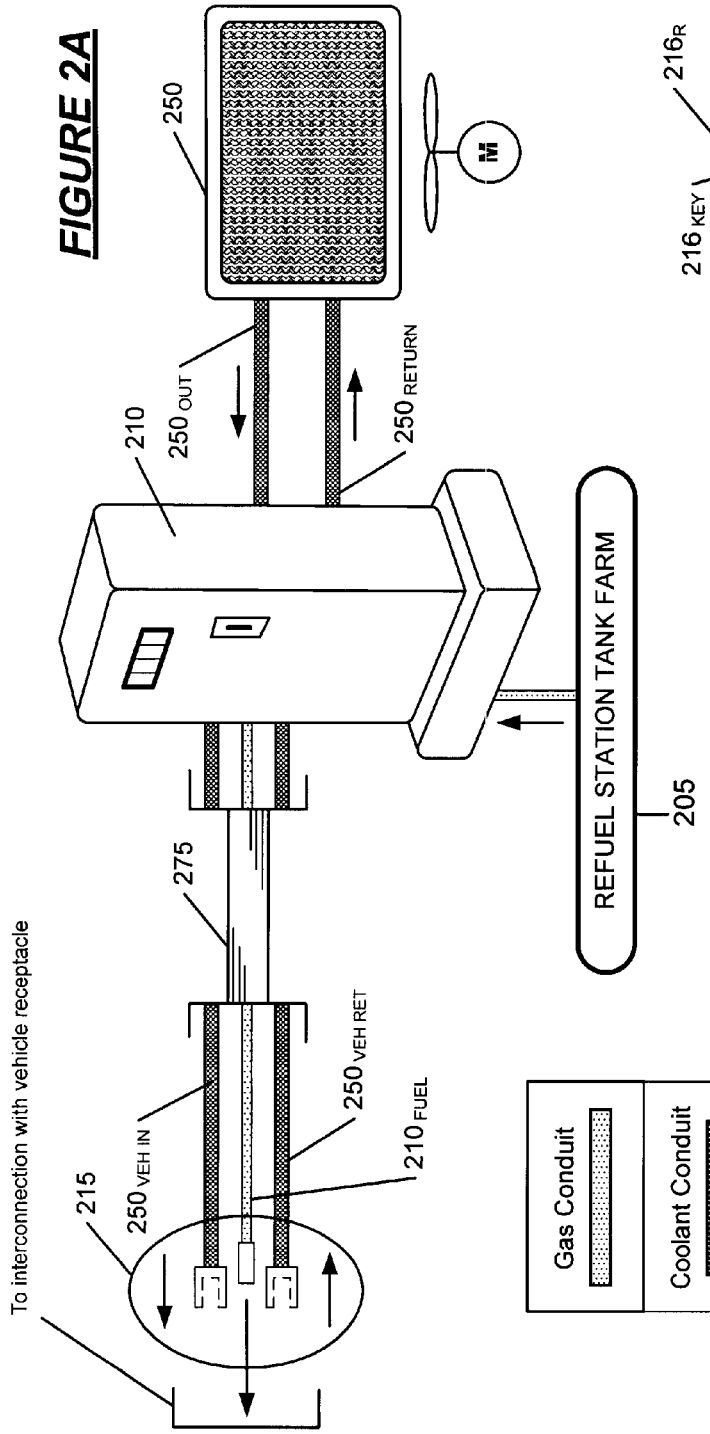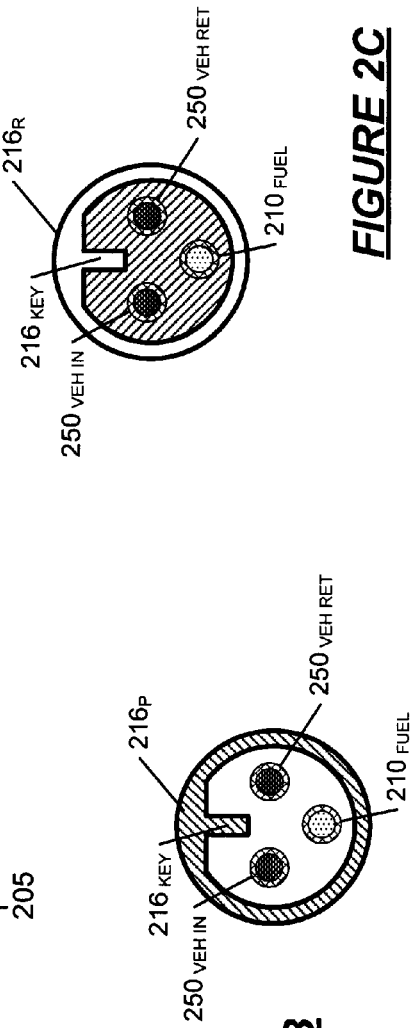

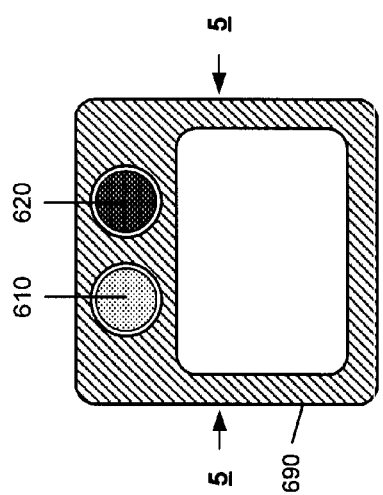
FIGURE 5B
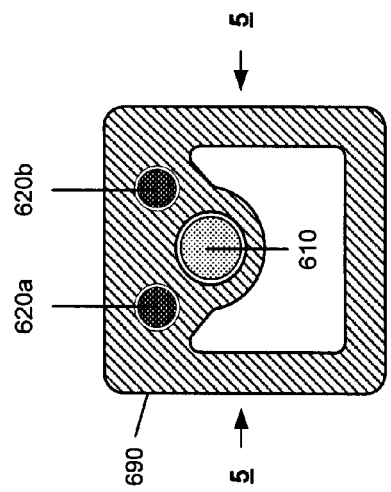
FIGURE 5D
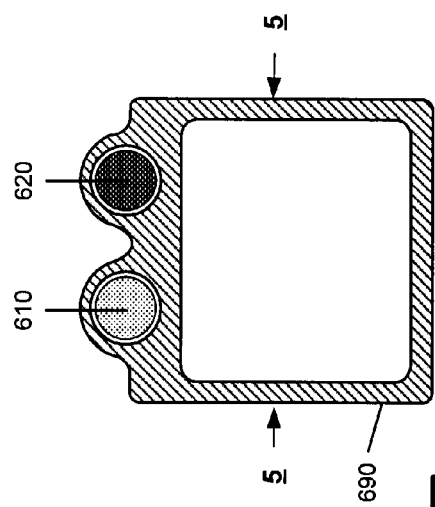
FIGURE 5A
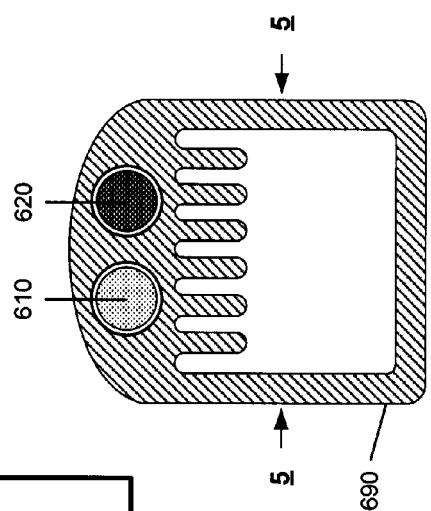
FIGURE 5C
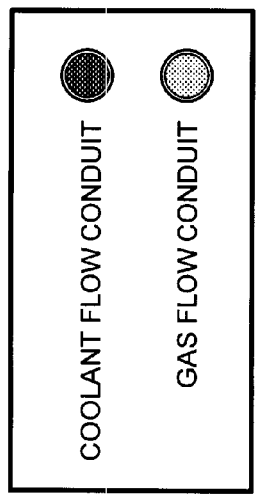

STATION SIDE COOLING FOR REFUELING VEHICLE STORAGE TANKS WITH HIGH PRESSURE FUEL

FIELD OF THE INVENTION

The present invention relates to a station side gas cooling apparatus and a system for enhancing the refueling efficiency of on board vehicle high pressure storage tanks for compressed natural gas or hydrogen.

BACKGROUND OF THE INVENTION

When hydrogen is used as a fuel in motor vehicles, a hydrogen fuel depot infrastructure for refueling must also be developed. Typically, in the use of hydrogen to fuel motor vehicles, or in the use of compressed natural gas (CNG) to power engines in motor vehicles, present practice is that hydrogen is stored in refillable on board fuel tanks having a maximum design pressure in the range of about 5000 psi, CNG is stored in tanks having a maximum design pressure in the range of about 3600 psi. Pressures exceeding 3600 psi for CNG and 5000 psi for hydrogen and in the range of about 10,000 psi or more are likely to be utilized as the use of high pressure fuel gas technology becomes more widespread in motor vehicle applications. High pressure gas powered vehicles typically utilize light weight reinforced polymer/composite storage tanks to store gaseous fuel on board at high pressure. Herein, reference to hydrogen powered vehicles correlates with the use of the invention with compressed natural gas powered vehicles (CNGVs). When hydrogen is referred to in the specification, that term is intended to be interchangeable, evident in context, with compressed natural gas, high pressure fuel gas, or gaseous fuels in general.

I have previously filed numerous applications for patent in the United States Patent Office relating to various designs for high pressure hydrogen refueling systems—particularly in situ and on board cooling apparatus. Without more, during a high pressure refueling process, the interior of the on board tanks, namely, the gas itself, becomes heated as a result of gas compression as the tank pressure increases and other refueling parameters affect refueling. Conventionally, it is not usually possible to obtain a full refill tank pressure to a high pressure design maximum, for example, 10,000 psi (70 MPa), without a pressure or temperature compensation system during the course of refueling. Namely, the charge of gas fuel input into and stored in the tank must be initially in excess of the optimum design tank pressure because of the gas compression/heating effect caused by the high pressure compression of gas in the tank as a result of refueling. Without some form of compensation or treatment, vehicle mileage in terms of vehicle range is reduced as a result of the compression/heating effect. As higher tank design pressures are utilized, a full tank refill to optimum capacity becomes more difficult and an underfill results.

Solutions have been proposed to resolve this under fill problem encountered with high pressure tanks. A slower flow rate during refill results in a lower initial tank temperature, however, a slow fill, is undesirable, and may be impractical when significant numbers of refuel customers are involved. An undesirable consequence of a slower flow rate during refueling to avoid heat build up is a longer refueling time. Another option is to cool the gas before refueling. Pre-cooling to a very low temperature to ameliorate compression heating effects, however, requires substantial energy, thereby reducing the overall energy efficiency of a high pressure gas infrastructure. A low temperature pre cool may occur in real time simultaneously with the introduction of high pressure gas into the vehicle tank; or a quantity of high pressure gas at the tank farm intended for refueling dispensation may be pre cooled in bulk at the station, and then conveyed to the vehicle tank through the refuel meter. A pressure overfill is another option that requires an additional energy expense in gas compression. Higher pressure, however, exacerbates the heat generated in the tank as a result of higher pressure compression. While secondary pre-treatment of refill gas is generally unnecessary when fill pressures are at 5000 psi or lower, when tank pressures exceed 3600 psi (CNG) and 5000 psi (hydrogen), and approach or exceed 10,000 psi, gas volume or quantity compensation becomes an important factor in the refueling process so that a full tank capacity fill may be achieved.

OBJECTS OF THE INVENTION

It is an object of the present invention to minimize energy use and reduce the expense and complexity of cooling systems used to enhance efficiency in high pressure fuel gas refilling systems. Typically, each time a vehicle is refueled with high pressure gas, compression energy results in tank (namely, the gas inside the tank) heating, hence, it is an object of the invention to minimize high pressure gas and tank heating and to increase the efficiency and refueling capacity of an on board fuel storage tank in high pressure gas powered motor vehicles. It is an object of the invention to provide a station side cooling system that can remove the compression heat resulting from the refueling of an on board tank during a high pressure refuel. A faster refueling time, increased refueling efficiency and overall vehicle range increase will result because improved tank capacity per unit volume is achieved, particularly where nominal or optimum design capacity refill pressure approaches 10,000 psi (70 MPa) or greater.

SUMMARY OF THE INVENTION

In accordance with the present invention, reduction of fuel tank heating during the refueling process, is effected by a coolant exchange between the station and the vehicle. The station coolant cools the refill gas through an on board heat exchanger as the tank is charged with a high pressure refill from the station. As a result of station provided cooling in accordance with the invention, the vehicle does not need to have particularly complicated on-board cooling devices, nor does the station need to be encumbered with complex and expensive cooling devices. Vehicle cost and weight are reduced. In the invention, the refueling station requires a modest coolant system, generally capable of reducing gas temperature to an ambient level associate with "normal" tank temperature, typically 20° to 25° C., dependent on weather and climate conditions. Because the cooling temperature in the invention is ambient temperature, the cost of the cooling system of the invention is less than the cost of a conventional pre-cooling, or gas cooling, unit that reduces the refuel gas to a low temperature range of about −20° C. or less in the process of refilling.

In the invention, an interior tank heat exchanger (HEX 1) absorbs the heat of refueling and is interconnected with an on beard heat exchanger (HEX 2). HEX 2 is in turn interconnected at the station with a station provided ambient temperature cooling unit. The tank interior HEX 1 absorbs tank heat resulting from high pressure gas compression; the compression heated gas is circulated through a cooling loop system through the on board HEX 2 until the gas is cooled sufficiently to ambient temperature for storage in the on board tank.

The invention is described more fully in the following description of the preferred embodiment considered in view of the drawings in which:

BRIEF DESCRIPTION OF THE SEVERAL VIEWS OF THE DRAWINGS

FIG. 2A illustrates a station side system of the invention wherein an ambient temperature cooler is interconnectable with an on board vehicle heat exchanger during the process of a refill from the gas refueling depot to the vehicle tank. FIG. 2B shows a plug, and FIG. 2C shows a receptacle, both in plan view, of an interconnection system for the cooling loop and the refill gas in an interconnection between the station meter and the vehicle.

FIG. 5A, FIG. 5B, FIG. 5C, and FIG. 5D are cross sections, through section 5⇌5 of FIG. 4, illustrating examples of station provided cooling conduit paths and gas flow conduit paths embedded in a vehicle sub frame structure.

DETAILED DESCRIPTION OF THE INVENTION

Figure 1:
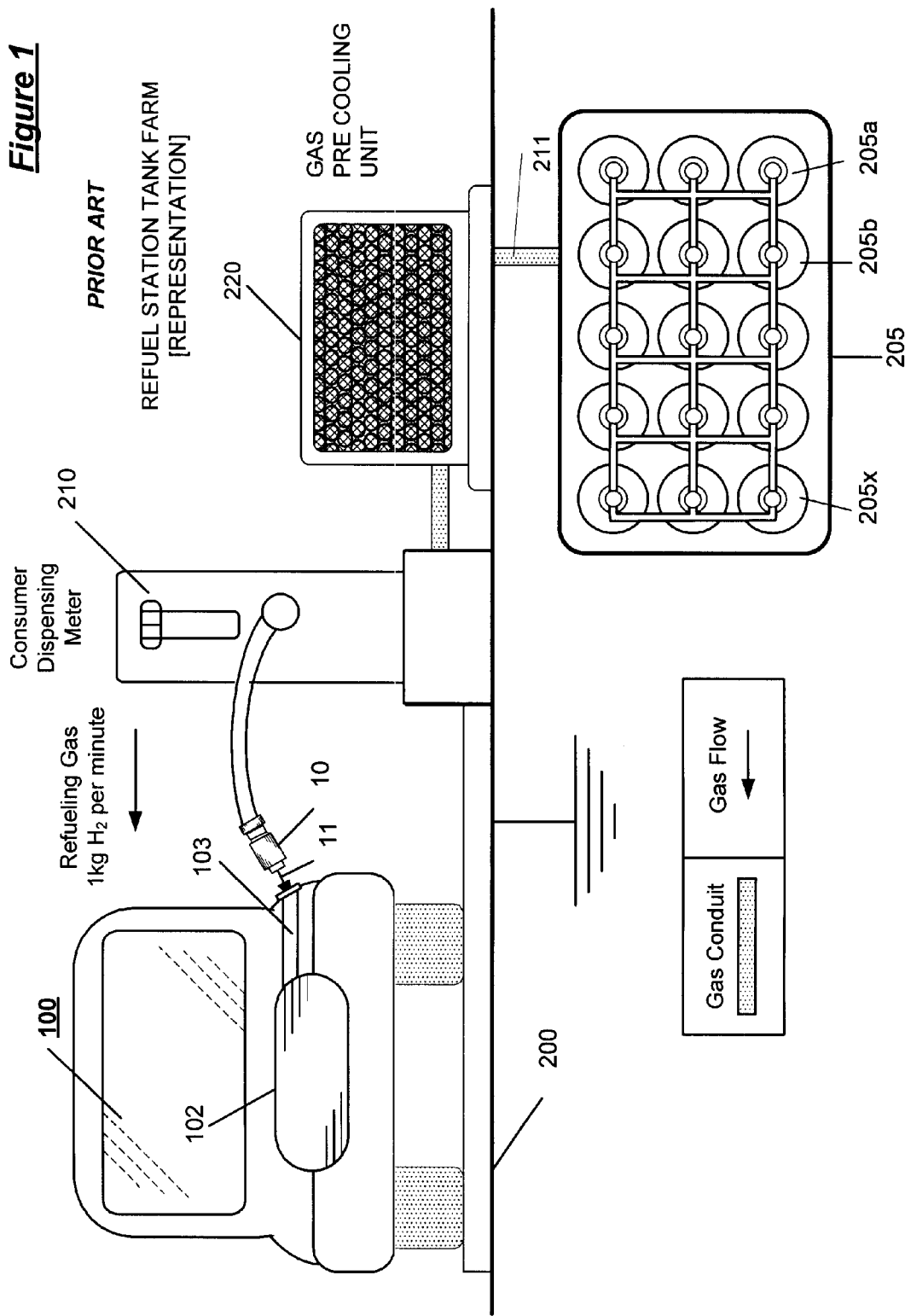
FIG. 1 is a diagram of a conventional station side gas pre cooling, or gas cooling, system characterized by an operating cooling temperature of −20° C. or less.

The invention increases the refueling energy efficiency of hydrogen powered vehicles by withdrawing the heat of refilling compression from the high pressure gas introduced into on board tanks whether or not a slow fill, a pressure overfill or pre cooling of the gas occurs at the refueling station. Because the invention reduces the overall energy required to recharge the on board vehicle tanks with high pressure gas to a full optimal state, overall infrastructure energy requirements are reduced. When a full refill is achieved, vehicle mileage range is increased, the need for short interval refills is reduced, and consumer satisfaction is enhanced. A cooling circuit is disposed within the on board tank circulating the refill gas through an in situ on board tank HEX 1. Heat absorbed in HEX 1 is conveyed by the circulating refueling gas to a second heat exchanger, HEX 2, exterior to the tank, where the absorbed heat is eliminated by an ambient temperature heat exchange.

The invention provides a coolant system wherein a station cooler at the high pressure gas refueling station provides a temperature to a coolant media circulating therein approximately equivalent to the ambient temperature in the tank environment. The cooler includes an inlet and an outlet for the flow of the coolant media therethrough from and returning to the cooler. The vehicle gas tank includes an interior heat exchanger (HEX 1) having a gas flow circuit allowing the flow of gas therethrough from a gas inlet to a gas outlet. HEX 1 allows heat generated by the high pressure refueling to be transferred to the gas flowing therethrough. A second heat exchanger exterior to the vehicle fuel tank (HEX 2) is also provided. HEX 2 has a gas flow circuit allowing the flow of gas therethrough from a gas inlet to a gas outlet and dissipates the heat absorbed by the gas flowing within HEX 1. HEX 2 also includes a coolant media flow circuit therein, separate from the gas flow circuit, allowing the flow of coolant media therethrough from a coolant inlet of HEX 2 to the coolant outlet of HEX 2. The elements are interconnected in a gas flow circuit interconnection from the refueling station to the inlet of HEX 1 and from the outlet of HEX 1 to the inlet of HEX 2 and from the outlet of HEX 2 into the vehicle tank. A separate flow circuit for coolant media leads in a closed flow loop from the outlet of the cooler at the station to the coolant inlet of HEX 2; the coolant circulates through HEX 2, exits from the coolant outlet of HEX 2, and returns to the cooler through the cooler inlet. Interconnections are provided between the vehicle and station for temporarily allowing a refueling gas flow interconnection between the inlet of HEX 1 and the refueling station gas dispenser and a coolant media flow interconnection connecting the flow of the coolant media to and from HEX 2 and from and to the station cooler during the process of refueling.

The system typically cools to an ambient temperature usually in the range of approximately 20° C. to approximately 25° C. Receptacle and plug devices 10 interconnect the coolant and gas flows between the vehicle and the station. In one example, HEX 2 is a stand alone unit installed upon the vehicle frame or HEX 2 may be a unit installed at the station exterior to the vehicle allowing gas flow therethrough in the same manner. Cooperative receptacle and plug interconnections for the refueling gas and the coolant media may be combined in the plug/receptacle device on each of the station side and the vehicle side of the system.

In another example, the gas flow circuit of HEX 2 and the coolant media flow circuit of HEX 2 are integrated in the vehicle frame, preferably integrated in separate flow conduits intrinsic to the vehicle frame and comprising separate conduit systems. The station cooler may include an assistive refrigerant system for maintaining the temperature thereof at an ambient level and/or a fan for air circulation. Gas and coolant flow conduits may be formed in a sub frame structure of the vehicle such as a sub frame within which one or more vehicle tanks are installed.

A conventional station side gas pre cooling system characterized by an operating cooling temperature of −20° C. or less is shown in FIG. 1. In FIG. 1, the high pressure gas powered vehicle, shown at 100, includes a fuel tank 102 interconnectable to a refuel depot receptacle through filling tube 103; gas flow from the refueling station meter 210 to the vehicle tank 102 is indicated by arrow 11. A refueling station will typically include a grounding pad 200 interconnected with the consumer dispensing meter 210 to reduce static electric effects that may cause a spark. The station will also include a tank farm 205, comprised of multiple tanks, 205a, 205b, ... 205x, being a high pressure source of gas interconnected through gas flow conduit 211 with the dispensing meter 210. A fluid coolant (gas or liquid) circulates (driven by a pump) in a loop from very low temperature cooling unit 220 that provides a low temperature in the range of about −20° C. The loop circulates through $HEX_{STATION}$ where the refill gas is exposed to the very low −20° C. temperature and heat in a pre cooling operation before the gas is introduced at high pressure into the vehicle tank. In such a pre cooling system, cooling the gas to a low temperature reduces the gas volume pre pressure unit and permits more gas to be filled into the tank. Without temperature reduction, a high pressure gas refill will increases gas temperature and gas volume, reducing the amount of gas available to be stored in a tank of given capacity. Using a hydrogen refill as an example, refueling gas is transferred to the vehicle tank at the rate of 1 kg $H_2$ per minute. When gas is filled in the vehicle tank, entropy will result in a tank/gas temperature approximating the ambient temperature, 20° to 25° C., dependent on weather and climate conditions. The temperature difference between tank gas and the pre cooling is approximately 45° C., hence, with pre cooling, the cooler the gas is at refill, the more gas that can be loaded into the tank.

Figure 2E:
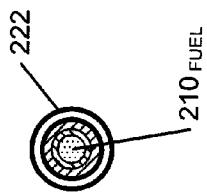
FIG. 2E and FIG. 2F show examples of plug/receptacle devices used in the system of FIG. 2D.
Figure 2F:
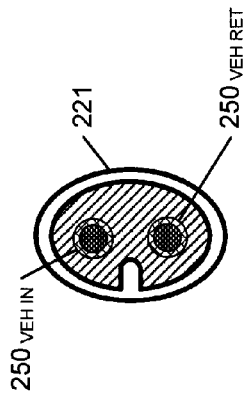
Figure 2D:
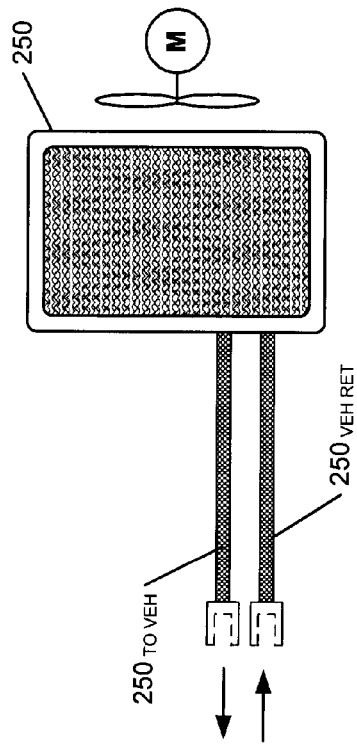
FIG. 2D shows separate station gas meter and coolant systems interconnectable with a vehicle.
Figure 2D:
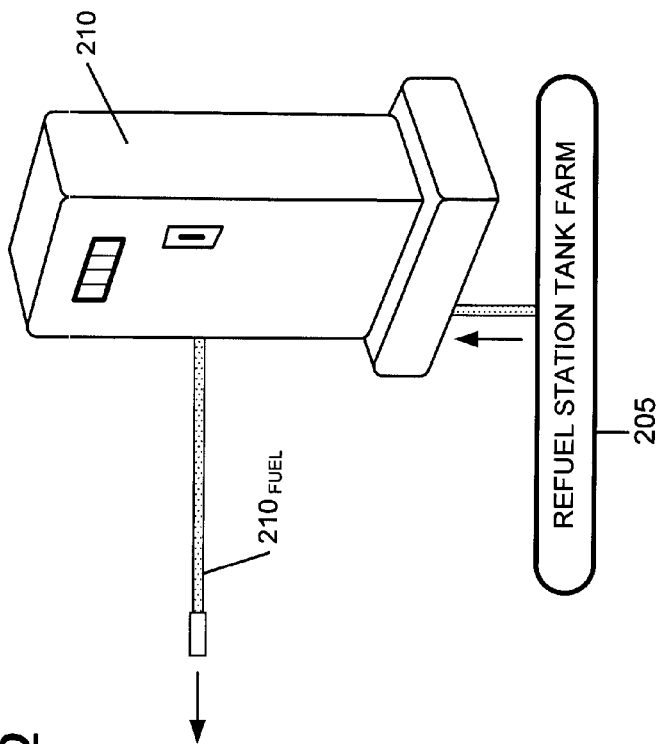

In the example of the invention shown in FIG. 2A, an ambient temperature cooler 250 is provided at the station such that the coolant fluid of the cooler may be interconnected (either through the station pump 210 (FIG. 2A) or separately (FIG. 2D)) to provide a cooling loop between HEX 1 on board the vehicle an the station cooler 250. Unit 250 is a typical ambient refrigerator/cooler including a compressor, motor, fan, temperature control and the like such that temperature in the refilling gas will be maintained at an ambient level, for example, 20° to 25° C., despite the high pressure (and heat) resulting in the refill. Cooler capacity is determined as a result, inter alia, of the coefficient of heat transfer of the refill gas, gas circulation volume, heat exchanger efficiency for HEX 1 and HEX 2, temperature difference, and other known parameters. Coolant flow conduits 250 OUT and 250 RETURN lead from the ambient cooling unit 250 to the consumer meter 210. The consumer meter 210 integrates gas flow from the station tank farm 210 and the cooling system 250. Leading from the meter to the vehicle is an integrated conduit cable 275 including separate conduits for fuel gas $210_{FUEL}$ and coolant vehicle in $250_{VEH\ IN}$ and coolant vehicle return $250_{VEH\ RET}$ for the ambient cooling system 250. The cable 275 is interconnectable with the vehicle through a plug and receptacle system 215 at the terminal ends of each conduit $210_{FUEL}$, $250_{VEH\ IN}$ and $250_{VEH\ RET}$. Examples of plug and receptacle devices are respectively shown in FIG. 2B and FIG. 2C as reverse images of each other, plug $216_P$ and receptacle $216_R$. Key $216_{KEY}$ is provided to prevent misalignment of the plug and receptacle when interconnected. FIG. 2D shows an example wherein the gas flow conduit $210_{FUEL}$ and the coolant in/coolant out conduits, $250_{VEH\ IN}$ and $250_{VEH\ RET}$, are separately provided for interconnection to the vehicle at the station. FIG. 2E and FIG. 2F show coolant 221 and gas 222 receptacle/plug devices useful with the system of FIG. 2D.

Figure 3:
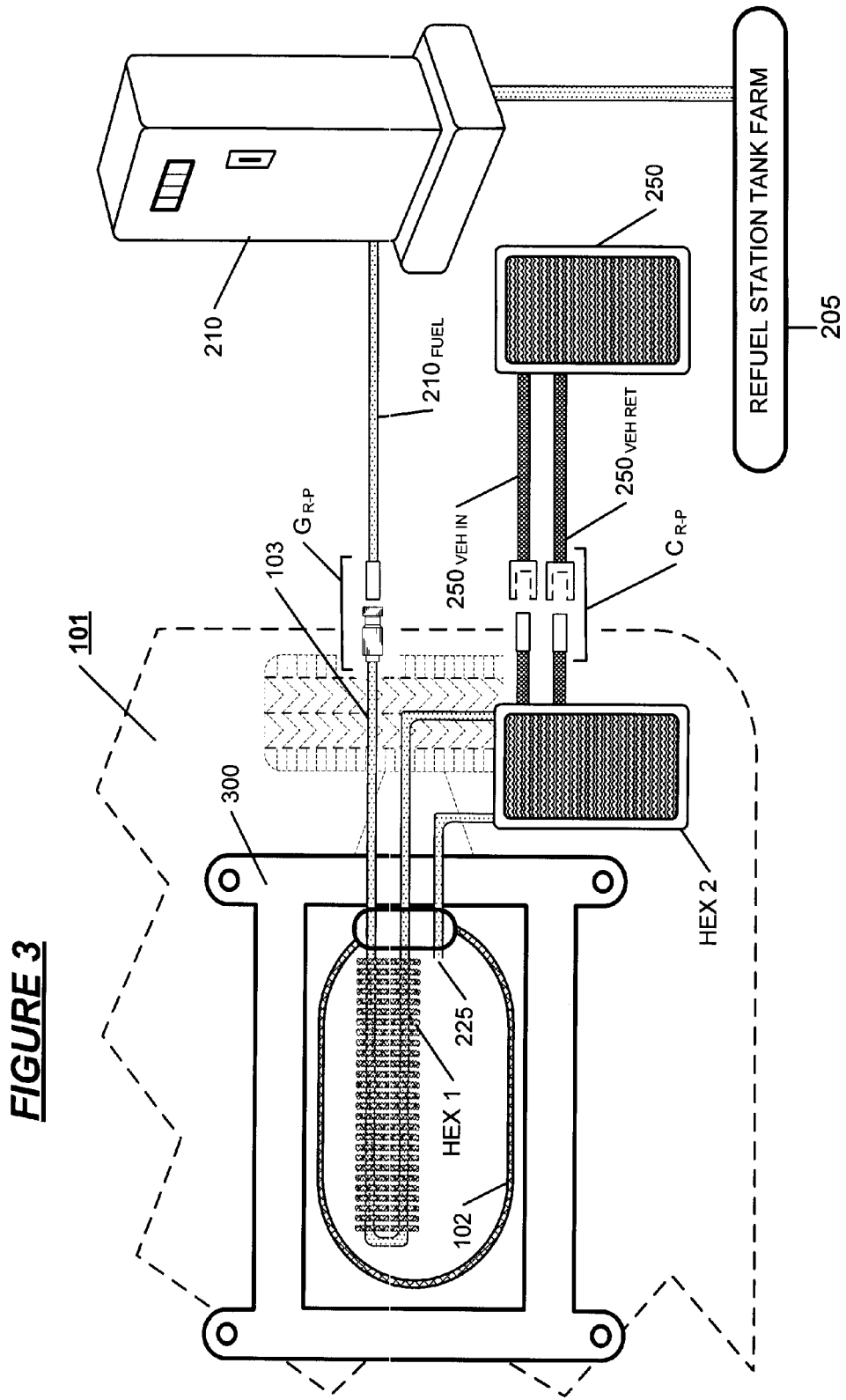
FIG. 3 shows an example of a system of the invention wherein a vehicle is interconnected with the refuel station gas and cooling supply and gas flows through internal vehicle HEX 1 where heat is absorbed and external on board HEX 2 for cooling.

FIG. 3 shows an example of a tank 102 including internal HEX 1 installed in a vehicle sub frame 300 proximate to an on board cooler HEX 2 within a vehicle body 100. Gas from the inlet tube 103 flows through HEX 1 through HEX 2 and ultimately into the tank 102 through inlet opening 225. The gas flow conduit and the coolant in and coolant return conduits are interconnected with the refuel station apparatus, meter 210 and cooler 250 separately through the interconnections shown at $G_{R-P}$ and $C_{R-P}$.

Figure 4:
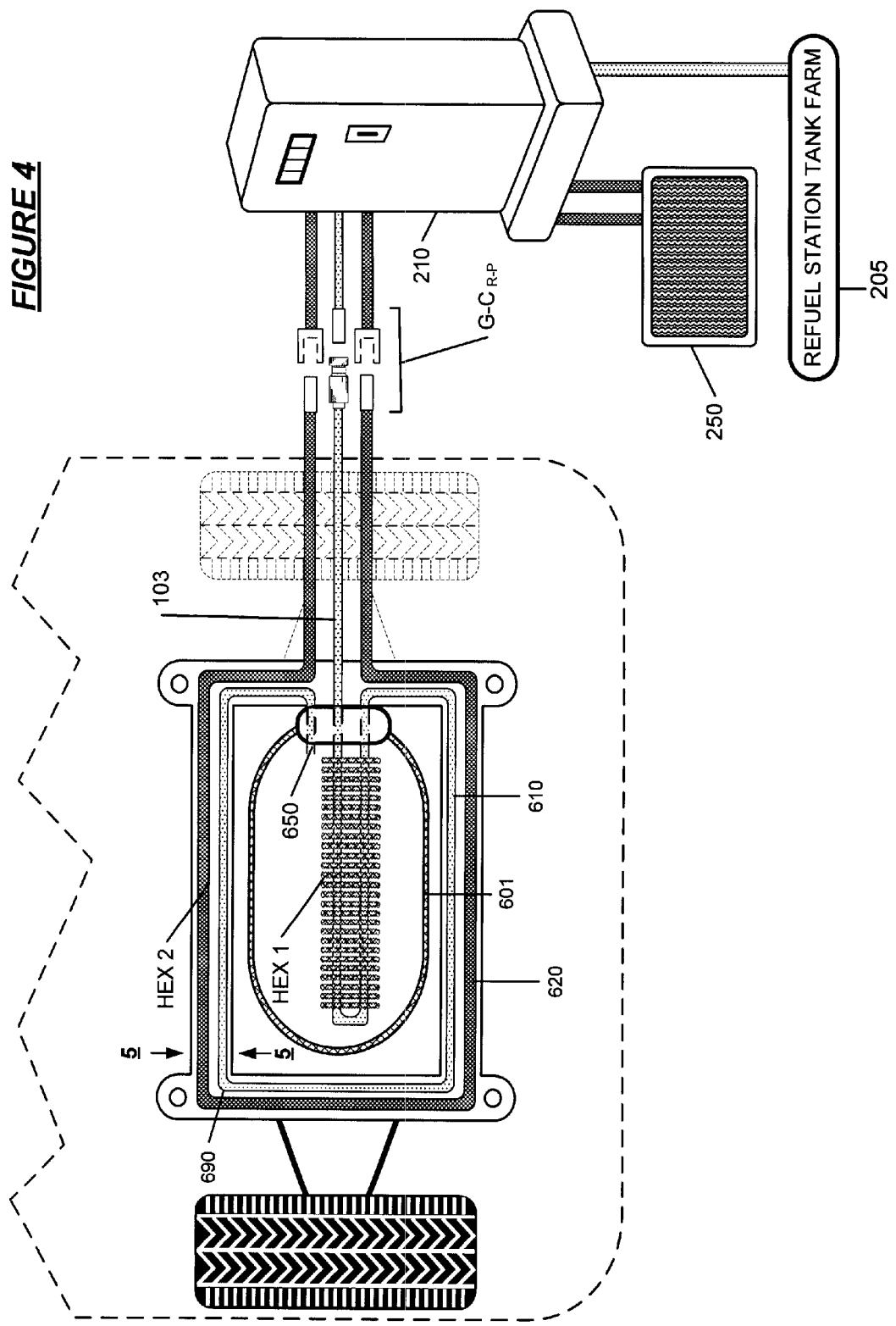
FIG. 4 shows an example of the invention wherein the coolant circuit is formed in a conduit within a vehicle sub frame structure as HEX 2 to provide gas cooling; the refill gas circulation path from the in situ tank HEX 1 is also formed within the vehicle sub frame structure proximate to the HEX 2 conduit.

In FIG. 4, the internal heat exchanger HEX 1 in the tank 601 is interconnected with a gas flow conduit circuit 610 and coolant flow conduit circuit 620, both embedded in a vehicle sub frame structure 690. Refill gas flows through conduit 103 into tank HEX 1, then through gas flow sub frame conduit 610 and enters the tank through inlet 650. In the example of FIG. 4, the sub frame 690 is HEX 2 wherein the heat from gas circulating in conduit 610 is cooled by coolant circuit 620 within the sub frame 690. The gas from meter 210 and coolant from cooler 250 interconnections between the vehicle and the station are effected by the cooperative receptacle plug device shown at G-$C_{R-P}$. FIG. 5A, FIG. 5B and FIG. 5C depict examples of configurations of coolant conduit 620 and gas conduit 610 tube circuits embedded in the vehicle sub frame. In FIG. 5C, fins within the sub frame assist in cooling. FIG. 5D depicts a plurality of coolant tubes, 620a and 620b, embedded in the sub frame proximate to the gas flow conduit 610. The number of flow tubes for gas and coolant embedded within the vehicle frame and their respective configurations and relationships are maters of design choice dependent on factors such as rate of gas flow, heat transfer coefficient of the sub frame material, gas residence time, and other parameters. A fan passing ambient air through the interstices if the internal space within the sub frame may assist in cooling.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A coolant system for reducing the heat of compression of a high pressure gas in the refill of a vehicle fuel tank at a high pressure gas refueling station comprising: a station cooler at the high pressure gas refueling station providing a temperature to a coolant media circulating therein approximately equivalent to the ambient temperature in the tank environment, the cooler having an inlet and an outlet for the flow of the coolant media from and returning to the cooler; an interior heat exchanger (HEX 1) in the vehicle fuel tank, the interior HEX 1 having a gas flow circuit allowing the flow of gas therethrough from a gas inlet to a gas outlet thereof, the interior HEX 1 allowing heat generated by the high pressure refueling to be transferred to the gas flowing therethrough; a heat exchanger exterior to the vehicle fuel tank (HEX 2), the HEX 2 having a gas flow circuit allowing the flow of gas therethrough from a gas inlet to a gas outlet thereof, the exterior HEX 2 dissipating the heat absorbed by the gas flowing within HEX 1, the HEX 2 further having a coolant media flow circuit therein, separate from the gas flow circuit, allowing the flow of coolant media therethrough from a coolant inlet of HEX 2 to the coolant outlet of HEX 2, a gas flow circuit interconnection for gas flow from the refueling station to the inlet of HEX 1 and from the outlet of HEX 1 to the gas inlet of HEX 2 and from the gas outlet of HEX 2 into the vehicle tank; a flow circuit for the coolant media leading in a closed flow loop from the outlet of the cooler at the station to the coolant inlet of HEX 2, circulating through HEX 2, exiting from the coolant outlet of HEX 2, and returning the coolant media to the cooler through the cooler inlet; a refueling gas flow interconnection between the inlet of HEX 1 and the refueling station gas dispenser; and a coolant media flow interconnection connecting the flow of the coolant media to and from HEX 2 and from and to the station cooler.

2. The system of claim 1 wherein the ambient temperature is in the range of approximately 20° C. to approximately 25° C.

3. The system of claim 1 wherein the refueling gas flow interconnection between HEX 1 and the station dispenser and the coolant media flow interconnections between HEX 2 and the cooler comprise a releasable receptacle and plug.

4. The system of claim 3 wherein the receptacle and plug interconnections for the refueling gas and the coolant media are combined in the same conjoinable single plug and single receptacle device on a station side and a vehicle side of the system.

5. The system of claim 1 wherein HEX 2 is installed within the vehicle.

6. The system of claim 1 wherein the gas flow circuit of HEX 2 and the coolant media flow circuit of HEX 2 are integrated in the vehicle frame.

7. The system of claim 1 wherein the gas flow circuit of HEX 2 and the coolant media flow circuit of HEX 2 are integrated in separate flow conduits in the vehicle frame.

8. The system of claim 1 wherein the gas flow circuit and the coolant media flow circuit comprise separate conduit systems integrated in the structure of the vehicle frame.

9. The system of claim 8 wherein the gas flow circuit and the coolant media flow circuit comprise separate conduit systems integrated into a sub frame structure of the vehicle.

10. The system of claim 9 wherein the gas flow circuit of HEX 2 and the coolant media flow circuit of HEX 2 are embedded in the sub frame.

11. The system of claim 9 further comprising cooling fins within the sub frame to assist in cooling.

12. The system of claim 9 further comprising a plurality of coolant tubes embedded in the sub frame to assist in cooling.

13. The system of claim 1 wherein the station cooler includes a refrigerant system.

14. The system of claim 13 wherein the station cooler includes a fan for air circulation.

15. The system of claim 14 wherein the refrigerant system includes a fan.

16. The system of claim 1 wherein more than one vehicle tank is installed in the vehicle.

17. The system of claim 1 wherein the cooler and the HEX 2 are releasably connected by an inflow receptacle and plug interconnection and an outflow receptacle and plug interconnection, and the refueling station and the HEX 1 are releasably connected by a second receptacle and plug interconnection from the refueling station.

18. The system of claim 1 further comprising a refueling station meter interconnected between the refueling station and the HEX 1.

19. The system of claim 18 further comprising a grounding pad in contact with the meter.

20. The system of claim 18 further comprising a low temperature cooling unit interconnected between the refueling station and the meter.

21. The system of claim 18 wherein the low temperature cooling unit cools the gas to about −20° C.

22. The system of claim 18 wherein the gas leaves the low temperature cooling unit at a temperature of about −20° C. and exits the HEX 2 at a temperature from about 20° C. to about 25° C.

23. The system of claim 1 further comprising a low temperature cooling unit interconnected between the refueling station and the HEX 1.

* * * * *